Patented July 23, 1940

2,209,019

UNITED STATES PATENT OFFICE 2,209,019

CRYSTALLIZATION OF ASPIRIN

Harold R. Slagh, Midland, Mich., assignor to The Dow Chemical Company, Midland, Mich., a corporation of Michigan No Drawing. Application June 24, 1938, Serial No. 215,604

6 Claims. (Cl. 260—480)

This invention concerns the purification of crude aspirin and a method for obtaining aspirin as an acid-free, free-flowing, monoclinic crystalline product.

Aspirin, as commonly prepared by the acetylation of salicylic acid, contains an appreciable residue of acetic acid occluded or otherwise held by the light, fine, fluffy needles in which the compound is obtained. This acid residue imparts both odor and taste to aspirin and is very difficult of elimination by the usual crystallization methods. In addition to the difficulties encountered in removing such acid residues, crystallization from many organic solvents leaves the product in the form of fine, fluffy needles, weighing on an average of 4 to 5 grams per cubic inch as determined with a standard Scott volumeter. This fine crystalline form is not desirable because of problems in handling, increased shipping costs, the tendency of such product to dust, and certain difficulties encountered in grinding and tableting the aspirin in admixture with starch for commercial distribution. It has been found that when an acid contaminated product is recrystallized from certain selected solvents, a relatively acid-free product is obtained. Representative of the solvents heretofore employed in such recrystallization are benzene, carbon tetrachloride, and the like, either alone or in admixture with small amounts of glacial acetic acid. Such crystallization methods have not proven particularly advantageous. While repeated recrystallization from benzene and carbon tetrachloride results in a product which is relatively acid-free, the aspirin is still obtained as light, fluffy, needles. Furthermore, benzene is hazardous because of its flammability. The use of mixtures of these solvents with acetic acid results in a flat, plate-like aspirin crystal, frequently retaining the undesirable taste and odor characteristics of the crude product. A further disadvantage in the use of acetic acid is that it is irritating to the skin of operators and corrosive to metal equipment. The percentage recovery of dissolved aspiron from any of the above solvents or combinations thereof is relatively low, necessitating such expensive steps as evaporation of the solvent where a high yield of the aspirin product is desired.

I have discovered that when impure and finely divided aspirin in the form of needle-like crystals is dissolved and subsequently crystallized from 1,4-dioxane or a solvent mixture comprising 1,4-dioxane as a substantial constituent and the effective solvent, the aspirin is obtained in the form of acid-free, coarse, free-flowing, mono-clinic crystals weighing from 8 to 12 grams per cubic inch according to the Scott volumeter test and substantially taste and odor free. This product is well adapted for commercial use and processing as in the preparation of medicinal compositions. The percentage recovery of dissolved aspirin by the cooling of a 1,4-dioxane solution is appreciably in excess of that possible from other solvents when employed in comparable amounts. An additional advantage lies in the fact that aspirin is appreciably more soluble in hot 1,4-dioxane than in other solvents heretofore employed, whereby reduced quantities of the dioxane are required, and the handling of crystallization mixtures is facilitated by reason of reduced volumes. Further advantages are that 1,4-dioxane is relatively non-flammable as compared to benzene and similar compounds, is non-irritating to the skin of human beings, and does not corrode metallic equipment.

The invention may be carried out by dissolving impure and finely crystalline aspirin in approximately an equal weight of 1,4-dioxane and subsequently slowly cooling the solution to a temperature at which the aspirin crystallizes from solution. The coarse, monoclinic crystals are then recovered from the mixture by any suitable means, such as filtration or centrifuging, and washed with a small amount of some volatile organic solvent in which the aspirin is difficultly soluble, e. g. ethylene chloride, carbon tetrachloride, chlorbenzene, and the like. The crystalline product so obtained is dried and may thereafter be employed as desired. Small amounts of acetic acid, salicylic acid, and other impurities remain in solution in the recovered solvent. This solvent may be reemployed in further crystallization processes until such time as these impurities reach a high concentration, whereupon the solvent may be removed as by evaporation and the mixture of aspirin and acid residues recovered.

Due to the high solubility of aspirin in hot 1,4-dioxane, it is frequently difficult to handle the semi-solid mush of crystals obtained upon cooling. To obviate this problem, there may be included in the crystallization solution or mixture a liquid diluent, and preferably one in which the aspirin is not appreciably soluble. The use of such materials as carbon tetrachloride, ethylene chloride, etc., in conjunction with 1,4-dioxane not only results in a more readily filterable suspension of crystals following the cooling step, but also serves to further reduce the flammability of the mixture.

While the recrystallization is generally carried out by dissolving the fine aspirin needles in the solvent at temperatures between 60° C. and the boiling temperature of the mixture, initial solvent temperatures of below 60° C. may be employed, the subsequent cooling step being carried to any desired temperature above the freezing point of the dioxane or dioxane solvent mixture employed.

The presence of water in the recrystallization mixture frequently results in a partial hydrolysis of the aspirin, yielding free salicylic acid. The possibility of such hydrolysis is avoided when from 1 to 2 per cent by weight of acetic anhydride, calculated on the amount of aspirin present in the composition, is included in the solvent mixture.

The following examples illustrate certain embodiments of my invention but are not to be construed as limiting the same:

Example 1

25 grams of acetic acid-contaminated aspirin in the form of finely divided needles and 20 grams of 1,4-dioxane were mixed together and heated on a water bath without stirring to 80° C., at which temperature the aspirin was entirely dissolved in the 1,4-dioxane. The solution was then slowly cooled from 80° to 20° C. over a period of 2 hours, whereby there was obtained a semi-solid mush of crystals. This product was filtered, the aspirin residue washed with a small amount of carbon tetrachloride, and air-dried. 20.2 grams of acetic acid-free aspirin in the form of free-flowing, coarse, monoclinic white crystals were thereby obtained. This product was substantially free of occluded solvent and weighed 9.81 grams per cubic inch by Scott volumeter test.

Example 2

A mixture of 22 grams of crude aspirin as fluffy, needle-like crystals, 20 grams of 1,4-dioxane, and 20 grams of ethylene chloride was heated on a water bath without stirring to 74° C., at which temperature the aspirin was entirely dissolved in the solvent mixture. The solution was cooled from 74° to 20° C. over a period of 2 hours, whereby a thick slurry of crystals resulted. This mixture was filtered and the residue washed with a small amount of cold carbon tetrachloride and air-dried, whereby there was obtained 17.9 grams of substantially odorless and tasteless aspirin as heavy, free-flowing monoclinic crystals weighing 8.44 grams per cubic inch.

Example 3

10 grams of acid-contaminated crude aspirin needles, 10 grams of 1,4-dioxane, 10 grams of carbon tetrachloride, and 0.2 milliliter of acetic anhydride were mixed together and warmed without stirring on a water bath to 75° C., at which temperature the aspirin was entirely in solution. The aspirin was then gradually precipitated by slowly cooling the solution from 75° C. to 25° C. The desired crystalline product was recovered by filtration of the mixture, the solid residue being washed with a small amount of cold carbon tetrachloride and thereafter oven-dried at 60° C. 8.2 grams of substantially odorless and tasteless aspirin was thereby obtained as heavy, monoclinic crystals weighing in excess of 8 grams per cubic inch, and conforming in every particular to the accepted specifications for the pharmaceutical product.

While the foregoing examples show the purification of crude aspirin to obtain a material of pharmaceutical grade and having the preferred mono-clinic crystal form, my new crystallization method may also be applied to substantially pure aspirin where it is desired to obtain a heavy crystalline product weighing in excess of 8 grams per cubic inch.

Other modes of applying the principle of my invention may be employed without departing from the spirit of the invention, provided the step or steps stated by any of the following claims, or the equivalent of such stated step or steps be employed.

I therefore particularly point out and distinctly claim as my invention:

1. A method which comprises the steps of dissolving aspirin in an essentially anhydrous solvent comprising a substantial proportion of 1,4-dioxane as the active dissolving agent, and subsequently cooling the solution to precipitate heavy, monoclinic crystals of acid-free aspirin therefrom.

2. A method which comprises the steps of dissolving crude aspirin in an essentially anhydrous solvent comprising a substantial proportion of 1,4-dioxane as the active dissolving agent, subsequently slowly cooling the solution to below its crystallizing temperature, separating the solvent from the precipitated product, and drying the latter to obtain relatively coarse, free-flowing, monoclinic crystals of acetic and salicylic acid-free aspirin weighing from 8 to 12 grams per cubic inch as determined on a standard Scott volumeter.

3. A method which comprises the steps of mixing together approximately equal parts by weight of aspirin needles and 1,4-dioxane, warming the mixture to a temperature at which the aspirin is entirely in solution, slowly cooling the solution to a temperature below its crystallization temperature, separating out the aspirin precipitated therefrom, and drying the same.

4. A method which comprises the steps of dissolving aspirin, containing as impurities traces of the acids employed in its preparation, in an essentially anhydrous solvent mixture comprising a substantial proportion of 1,4-dioxane as the active dissolving agent and as a diluent a chlorinated organic solvent in which aspirin is not appreciably soluble, and subsequently slowly cooling the solution to precipitate heavy, monoclinic crystals of acid-free aspirin therefrom.

5. A method which comprises the step of dissolving crude aspirin in an essentially anhydrous solvent comprising from 1 to 2 per cent by weight of acetic anhydride and a substantial proportion of 1,4-dioxane as the active dissolving agent, and subsequently slowly cooling the solution to precipitate heavy monoclinic crystals of acid-free aspirin therefrom.

6. A method which comprises the steps of warming a mixture of acetic and salicyclic acid-contaminated aspirin, 1,4-dioxane, acetic anhydride, and a chlorinated organic solvent in which the aspirin is not appreciably soluble to a temperature at which the aspirin is entirely dissolved, slowly cooling the solution to a temperature below the crystallization temperature thereof, separating the solvent from the precipitate aspirin, and drying the same to obtain acid-free aspirin as a heavy, free-flowing, monoclinic crystalline product.

HAROLD R. SLAGH.